United States Patent
Huang

(10) Patent No.: US 6,779,886 B2
(45) Date of Patent: Aug. 24, 2004

(54) SPECTACLE AND FRONT MOUNTING LENS

(76) Inventor: Wen Tse Huang, PO Box 82-144, Taipei (TW)

( * ) Notice: Subject to any disclaimer, the term of this patent is extended or adjusted under 35 U.S.C. 154(b) by 0 days.

(21) Appl. No.: 10/445,001

(22) Filed: May 27, 2003

(65) Prior Publication Data

US 2004/0109129 A1 Jun. 10, 2004

(30) Foreign Application Priority Data

Dec. 5, 2002 (TW) .................................... 91220029 U

(51) Int. Cl.[7] .................................................. G02C 9/00
(52) U.S. Cl. .............................. 351/47; 351/48; 351/57; 351/58
(58) Field of Search .............................. 351/47, 48, 57, 351/58, 44, 41, 158, 124, 130

(56) References Cited

U.S. PATENT DOCUMENTS

| | | | | |
|---|---|---|---|---|
| 6,053,611 A | * | 4/2000 | Ku ................................ | 351/47 |
| 6,283,591 B1 | * | 9/2001 | Chen ............................ | 351/47 |
| 6,474,810 B1 | * | 11/2002 | Ng .............................. | 351/47 |
| 6,604,822 B1 | * | 8/2003 | Chen ............................ | 351/47 |

* cited by examiner

Primary Examiner—Hung Xuan Dang
(74) Attorney, Agent, or Firm—Leong C. Lei

(57) ABSTRACT

A spectacle and front-mounting lens is disclosed. The combination of the front-mounting lens and the spectacle comprises a spectacle body having two lens frame joined with a frame support; a front-mounting lens module having an engaging seat with two ends mounted with a front-mounting lens, the engaging seat is provided with an engaging slot having a width similar to thickness of the frame support, and the interior of the engaging seat is provided with an engaging rod having one end being a pressing end and exposed on the end face of the engaging seat, the other end being an engaging end which forms into a fulcrum by means of a support rod, and the lower section of the pressing end of the engaging rod being an elastic element and the elastic element exerting an upward elastic force to the pressing end, thereby the engaging slot correspondingly inserted into the frame support and the engaging end urges the vertical face at the inner lateral side of the frame support.

5 Claims, 10 Drawing Sheets

SPECTACLE AND FRONT MOUNTING LENS

BACKGROUND OF THE INVENTION

1. Technical Field of the Invention

The present invention relates to a combination of spectacle and front-mounting lens, and in particular, a front-mounting lens which can be pivotally attached to the spectacle frame.

2. Description of the Prior Art

Referring to FIG. 1, there is shown a conventional spectacle 10 having a front-mounting lens 11. The two sides of the nose supports 12, 13 of the secondary frame of the spectacle is provided with a magnet 14 to attract the front-mounting lens 11 to be hooked to the front side face of the spectacle 10 so that the front-mounting lens 11 will not be slide away. However, in this conventional spectacle structure, the area of the magnet cannot be too large and therefore, the attraction force is limited. If the front-mounting lens is moved horizontally, the front-mounting lens 11 will be dislocated from the spectacle 10. As a result, this conventional lens is not suitable for use when the wearer is performing some movement which will cause the spectacle to drop. Further, the magnet, after a long period of use of the front-mounting lens, will dislocate as the magnet will become demagnetize. In addition, the gap formed at the nose supports 12, 13 may be formed with contaminant which causes the front-mounting lens to loss its function. Accordingly, it is an object of the present invention to provide spectacle and front-mounting lens to mitigate the above drawbacks.

SUMMARY OF THE INVENTION

Accordingly, it is an object of the present invention to provide a combination of a front-mounting lens and a spectacle comprising a spectacle body having two lens frame joined with a frame support; a front-mounting lens module having an engaging seat with two ends mounted with a front-mounting lens, the engaging seat is provided with an engaging slot having a width similar to thickness of the frame support, and the interior of the engaging seat is provided with an engaging rod having one end being a pressing end and exposed on the end face of the engaging seat, the other end being an engaging end which forms into a fulcrum by means of a support rod, and the lower section of the pressing end of the engaging rod being an elastic element, and the elastic element exerting an upward elastic force to the pressing end, thereby the engaging slot correspondingly inserted into the frame support and the engaging end urges the vertical face at the inner lateral side of the frame support.

Yet another object of the present invention is to provide spectacle and front-mounting lens, wherein the engaging rod is provided with one or more than one engaging end.

A further object of the present invention is to provide spectacle and front-mounting lens, wherein the two front-mounting lenses are connected by a round rod and the external end of the engaging seat is mounted with a C-shaped slot such that the round rod is engaged within the C-shaped slot and the front-mounting lenses can be pivotally lifted up about the round rod.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
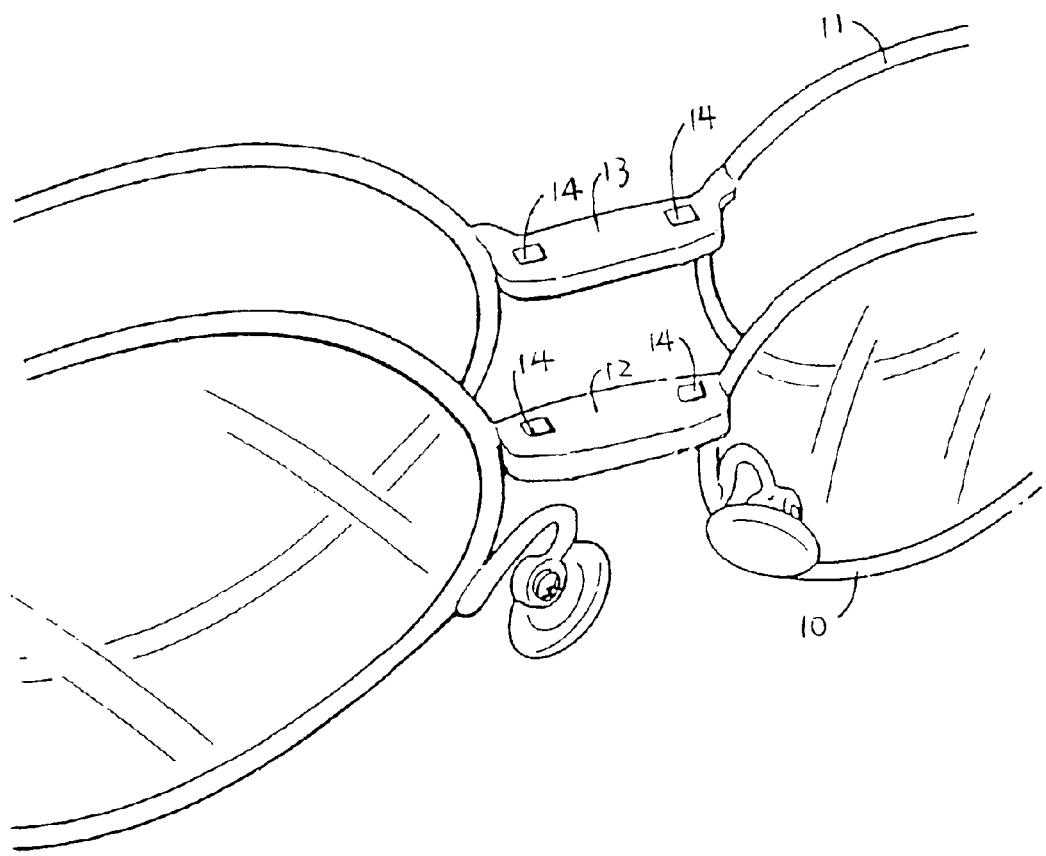
FIG. 1 is a perspective view of a conventional spectacle and the front-mounting lens.
Figure 2:
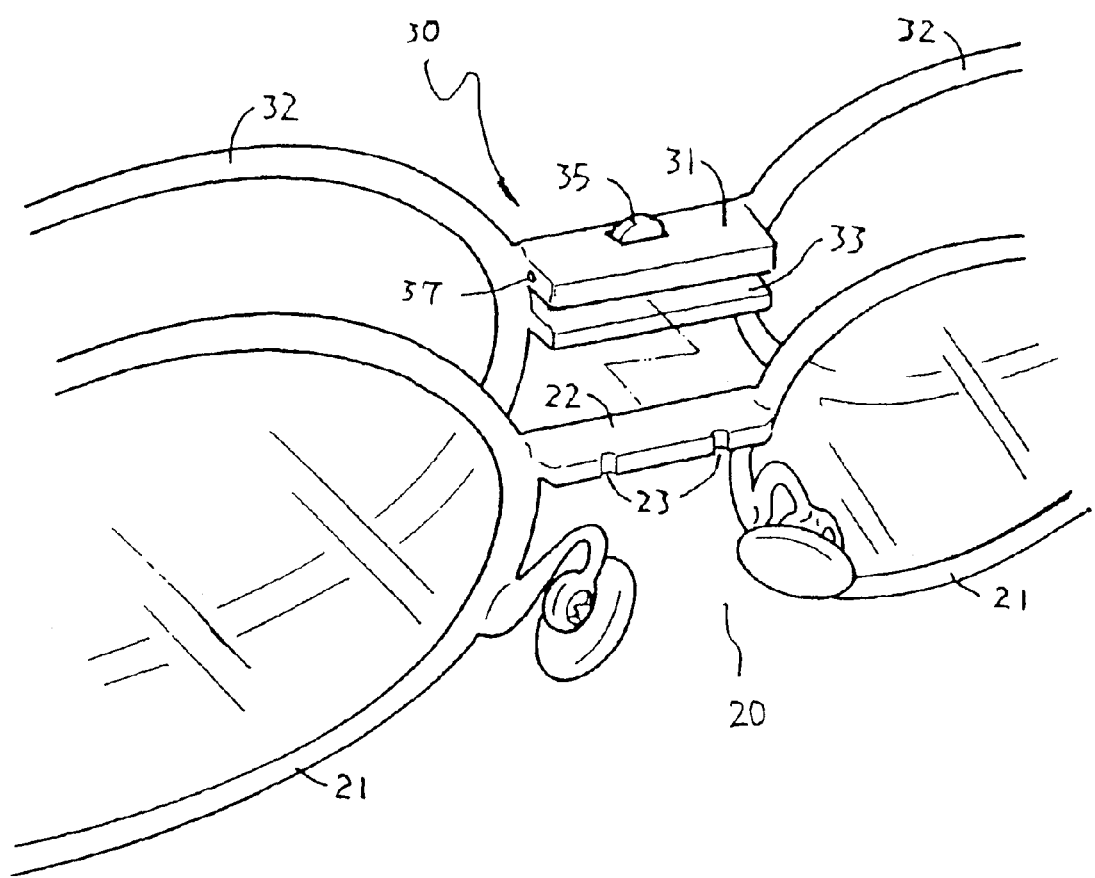
FIG. 2 is a perspective view of the present invention.
Figure 3:
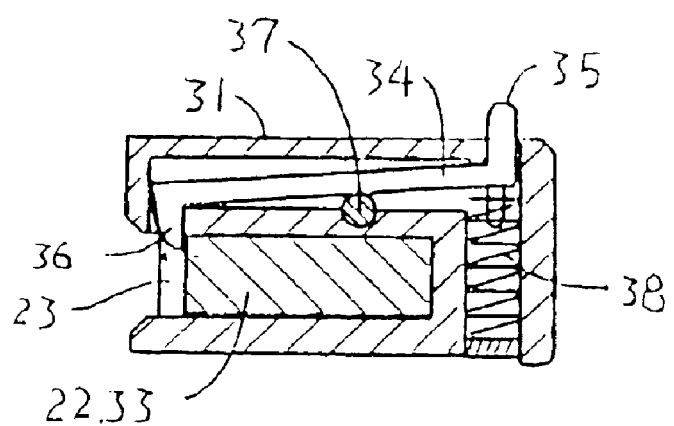
FIG. 3 is a sectional view of the engaging seat portion of the present invention.
Figure 4:
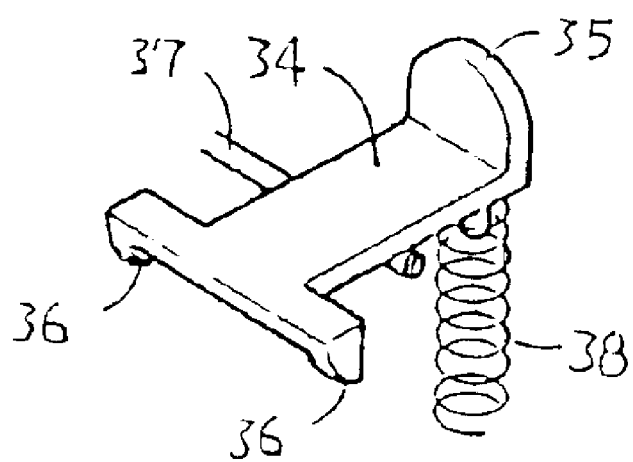
FIG. 4 is a perspective view of the stopping rod section in accordance with the present invention.

Referring to FIG. 2, there is shown a combination structure of a spectacle and a front-mounting lens comprising a spectacle body 20 and a front-mounting lens 30. The spectacle body 20 has two lens frames 21 connected with a lens frame support 22 between the two lens frames 21. The vertical face of the inner side of the support 22 is provided with a recess 23. Referring to FIGS. 2, 3 and 4, the front-mounting lens module 30 as an engaging seat 31 having two ends mounted to a front-mounting lens 32. The engaging seat 31 is provided with an engaging slot 33, and the width of the slot of the engaging slot 33 is identical to the thickness of the lens frame support 22. The interior of the engaging seat 31 is provided with an engaging rod 34 having one end being a press end 35 and is exposed at the end face of the engaging seat 31. The other end is an engaging end 36 and the engaging rod 34 becomes a fulcrum by means of a support rod 37 and the lower end of the press end 35 is provided with an elastic element 38. The elastic element 38 exerts an upward elastic force to the press end 35, and thus the engaging rod 34 can make use of the support rod 37 as a supporting point so that the engaging end 36 maintains downward. When the press end 35 is pressed or the engaging end 36 exerts an upward force, the engaging end 36 will move upward.

Figure 5:
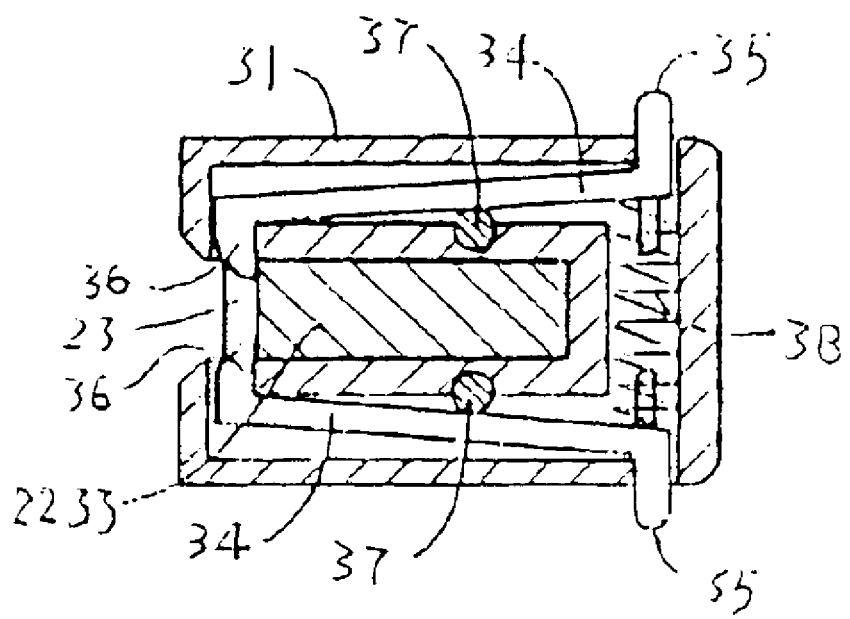
FIG. 5 is another preferred embodiment of the engaging seat portion in accordance with the present invention.

As shown in FIG. 3, the engaging seat 31 can have a single sided engaging rod 34, and as shown in FIG. 5, the top and bottom of the seat 31 are provided with an engaging rod 34.

Figure 6:
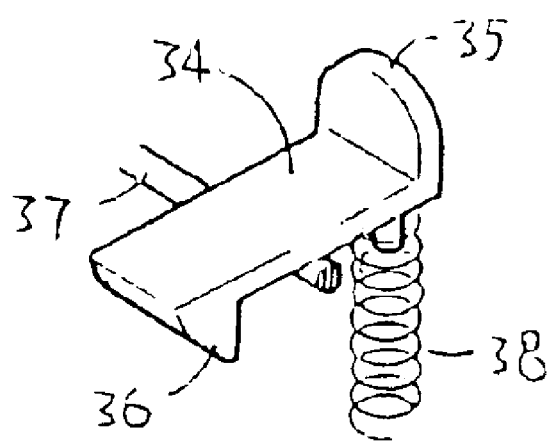
FIG. 6 is a perspective view of the engaging rod of another preferred embodiment of the present invention.
Figures 7A, 7B:
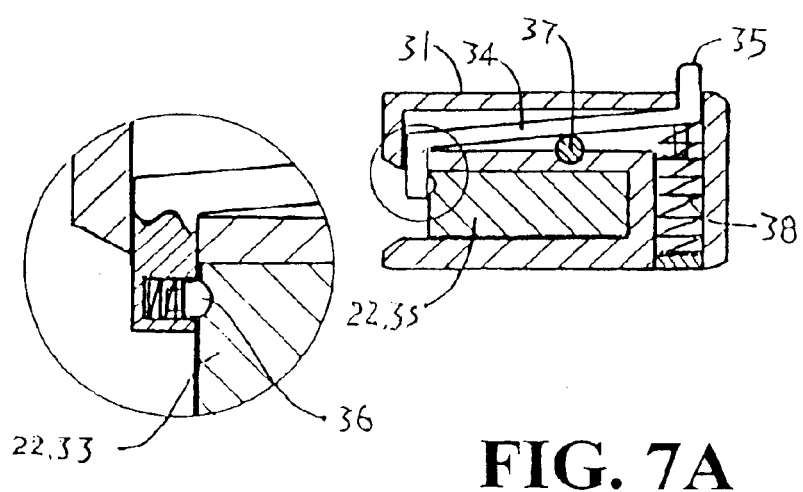
FIG. 7A is a sectional view of the engaging rod of another preferred embodiment of the present invention.
FIG. 7B is an enlarged view of a portion of FIG. 7A.
Figure 8:
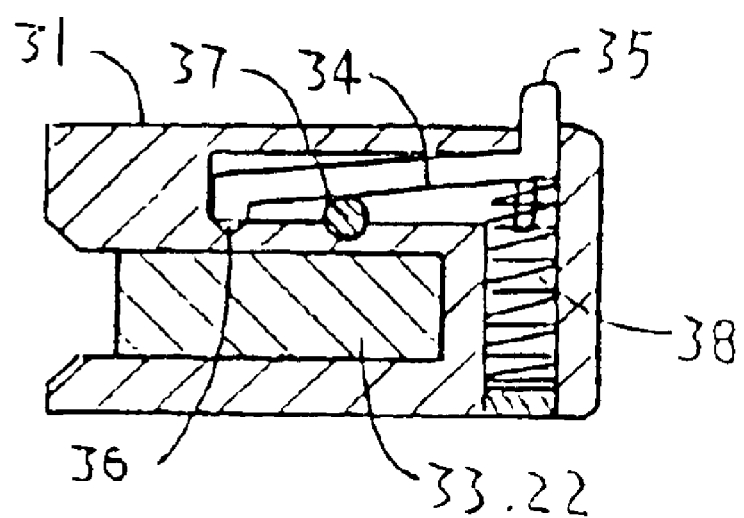
FIG. 8 is a sectional view of the engaging rod of another preferred embodiment of the present invention.

The engaging rod 34 can have two engaging ends 36 as shown in FIG. 4, and can have one engaging end 36, as shown in FIG. 6, and the engaging end 36 of the engaging rod 34 can be formed as one unit (as shown in FIGS. 3 and 5) or can be made into an elastic bead. The engaging end 36 of the engaging rod 34 can be a longer design as shown in FIGS. 7A and 7B, or as shown in FIG. 8, be a shorter design.

Figure 9:
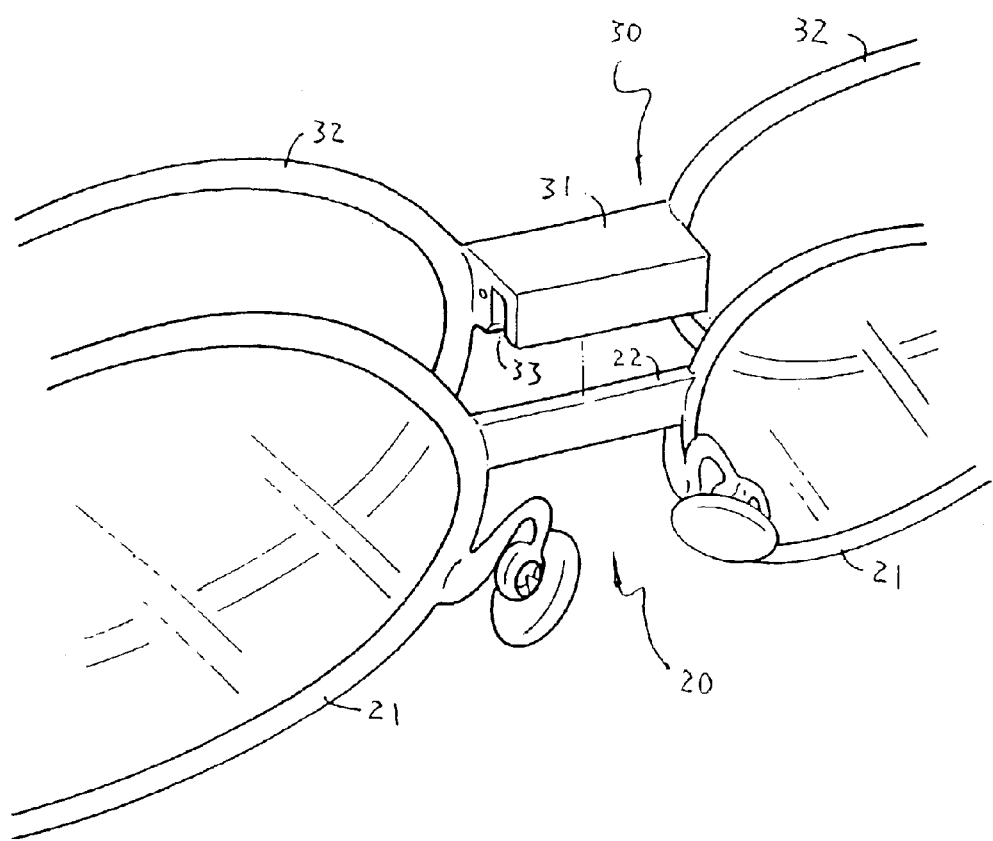
FIG. 9 is a perspective view of another engaging direction in accordance with the present invention.
Figure 10:
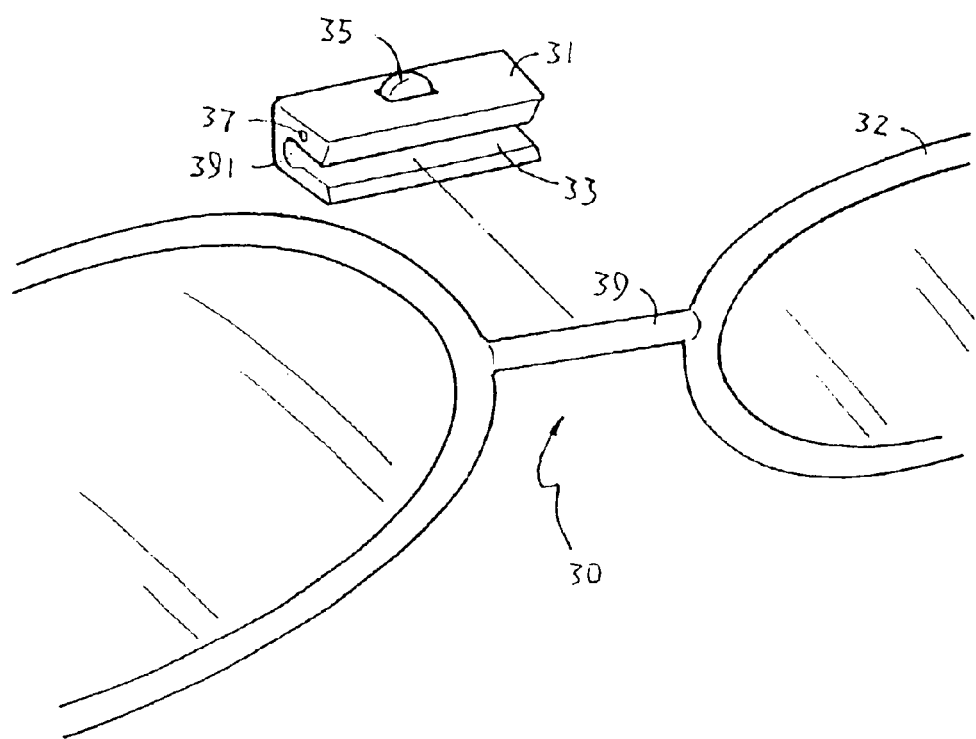
FIG. 10 is a perspective view of another preferred embodiment of the present invention.

Other than the combination as shown in FIG. 2, which is mounted in horizontal, the combination can be mounted vertically, as shown in FIG. 9. Referring to FIG. 10, the two front-mounting lenses 32 of the front-mounting lens module 30 can be connected with a round rod 39. The external lateral end of the engaging seat 31 is provided with a C-shaped slot 391, and the round rod 39 can be mounted within the C-shaped slot 391. The front lens 32 can make use of the round rod 39 as a shaft for lifting upward and downward.

The engaging slot 33 is correspondingly holding the frame support 22 such that the engaging end 36 urges the recess 23, and the two front-mounting lens 32 are mounted at the front of the two lens frame 21. If the lens module 30 is to be removed, the press end 35 is pressed and the engaging end 36 moves upward and is dislocated from the restriction of the lens frame support 22. Thus, the front-mounting lens 30 can be detached from the spectacle body 20. In accordance with the present invention, the engaging slot 33 holds the lens frame support 22 and the engaging rod 34 is mounted with the lens frame support 22 such that the lens module 30 can be pivotally hooked to the spectacle body 20 and the module 30 can be positioned either from a horizontal or a vertical direction. When the wearer uses the module 30 in jogging or jumping, the module 30 will be secured by firmly to the spectacle body without dislocation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A combination of a front-mounting lens and a spectacle comprising a spectacle body having two lens frames joined with a frame support; a front-mounting lens module having an engaging seat with two ends mounted with a front-mounting lens, the engaging seat is provided with an engaging slot having a width similar to thickness of the frame support, and the interior of the engaging seat is provided with an engaging rod having one end being a pressing end and exposed on the end face of the engaging seat, the other end being an engaging end which forms into a fulcrum by means of a support rod, and the lower section of the pressing end of the engaging rod being an elastic element, and the elastic element exerting an upward elastic force to the pressing end, thereby the engaging slot correspondingly inserted into the frame support and the engaging end urges the vertical face at the inner lateral side of the frame support.

2. The combination of the front-mounting lens and the spectacle of claim 1, wherein the engaging rod is provided with one or more than one engaging end.

3. The combination of the front-mounting lens and the spectacle of claim 1, wherein the engaging end is formed integrally as a unit and this is formed with elastic beads.

4. The combination of the front-mounting lens and the spectacle of claim 1, wherein the direction of the engaging slot is either horizontal or vertical, and the front-mounting lens is either horizontally or vertically mounted.

5. The combination of the front-mounting lens and the spectacle of claim 1, wherein the two front-mounting lenses are connected by a round rod and the external end of the engaging seat is mounted with a C-shaped slot such that the round rod is engaged within the C-shaped slot and the front-mounting lenses can be pivotally lifted up about the round rod.

* * * * *